(12) United States Patent
Eriksson et al.

(10) Patent No.: US 9,350,588 B2
(45) Date of Patent: May 24, 2016

(54) RECEIVER FOR MULTI CARRIER MODULATED SIGNALS

(71) Applicant: TELEFONAKTIEBOLAGET L M ERICSSON (PUBL), Stockholm (SE)

(72) Inventors: Thomas Eriksson, Göteborg (SE); Thomas Emanuelsson, Västra Frölunda (SE); Mats Rydström, Billdal (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/649,528

(22) PCT Filed: Dec. 14, 2012

(86) PCT No.: PCT/EP2012/075496
§ 371 (c)(1),
(2) Date: Jun. 3, 2015

(87) PCT Pub. No.: WO2014/090321
PCT Pub. Date: Jun. 19, 2014

(65) Prior Publication Data
US 2015/0326420 A1   Nov. 12, 2015

(51) Int. Cl.
*H03D 3/00* (2006.01)
*H03K 9/06* (2006.01)
*H04L 27/18* (2006.01)
(Continued)

(52) U.S. Cl.
CPC ...... *H04L 27/2657* (2013.01); *H04L 25/03273* (2013.01); *H04L 27/2671* (2013.01); *H04L 27/2675* (2013.01); *H04L 27/2679* (2013.01); *H04L 27/2691* (2013.01); *H04L 2025/03414* (2013.01)

(58) Field of Classification Search
USPC .............. 375/215, 211, 219, 220, 221, 222, 375/240.26–240.29, 267, 284, 285, 296, 375/299, 316, 324, 326, 327, 350, 349, 3, 375/47, 346, 340, 342
See application file for complete search history.

(56) References Cited

U.S. PATENT DOCUMENTS 7,702,035 B2 * 4/2010 Boesel .................. H04B 1/712
                                                             370/320
8,040,978 B2 * 10/2011 Lewis ................. H04L 27/2657
                                                             375/326
(Continued)

FOREIGN PATENT DOCUMENTS

EP          2157751 A1     2/2010

*Primary Examiner* — Linda Wong
(74) *Attorney, Agent, or Firm* — Rothwell, Figg, Ernst & Manbeck, P.C.

(57) ABSTRACT

A receiver for an MCM signal with pilot symbols, comprising a first phase adjustment unit for adjusting the phase of an MCM signal by means of the pilot symbols and to output a first phase adjusted MCM signal to an MCM re-modulator unit which demodulates and then modulates the first phase-adjusted MCM signal to create an MCM reference signal. The communications receiver also comprises a second phase adjustment unit which receives the first phase adjusted MCM signal and also the MCM reference signal. The second phase adjustment unit adjusts the phase of the first phase adjusted MCM signal by means of said MCM reference signal and outputs a second phase adjusted MCM signal to an output MCM demodulator which demodulates the second phase adjusted MCM signal and outputs the demodulated MCM signal.

15 Claims, 5 Drawing Sheets

(51) Int. Cl.
*H04L 27/26* (2006.01)
*H04L 25/03* (2006.01)

(56) References Cited

U.S. PATENT DOCUMENTS

| | | | | |
|---|---|---|---|---|
| 2002/0064240 | A1* | 5/2002 | Joshi | H04L 27/152 375/326 |
| 2005/0213678 | A1* | 9/2005 | Lewis | H04L 27/266 375/260 |
| 2005/0272374 | A1 | 12/2005 | Lewis | |
| 2006/0120472 | A1* | 6/2006 | Joshi | H04L 27/152 375/260 |
| 2006/0221808 | A1* | 10/2006 | Shirakata | H04B 7/0848 370/203 |
| 2008/0063012 | A1* | 3/2008 | Nakao | H04L 27/2657 370/500 |
| 2010/0323640 | A1* | 12/2010 | Lozhkin | H03F 1/3247 455/113 |
| 2012/0064844 | A1* | 3/2012 | Miyashita | H03L 7/16 455/84 |
| 2012/0201221 | A1* | 8/2012 | Mochida | H04B 7/0854 370/329 |
| 2012/0201331 | A1* | 8/2012 | Lim | H04L 27/183 375/308 |
| 2012/0257697 | A1* | 10/2012 | Zhou | H04B 7/1858 375/346 |
| 2013/0070874 | A1* | 3/2013 | Nakagawa | H04B 7/10 375/323 |
| 2013/0242283 | A1* | 9/2013 | Bailey | G01S 17/89 356/4.01 |
| 2014/0064418 | A1* | 3/2014 | Astrachan | H04B 1/30 375/344 |
| 2014/0140432 | A1* | 5/2014 | Weinholt | H04L 5/003 375/269 |
| 2014/0146923 | A1* | 5/2014 | Paker | H04L 27/0008 375/329 |

* cited by examiner

RECEIVER FOR MULTI CARRIER MODULATED SIGNALS

CROSS REFERENCE TO RELATED APPLICATION(S)

This application is a 35 U.S.C. §371 National Phase Entry Application from PCT/EP2012/075496, filed Dec. 14, 2012, designating the United States, the disclosure of which is incorporated herein in its entirety by reference.

TECHNICAL FIELD

The present invention relates to a receiver for MCM, Multi-Carrier Modulated signals, in particular one with improved phase noise suppression.

BACKGROUND

Multi-Carrier Modulated communications systems, so called MCM communications systems, have become very popular of late and are used for instance in the LTE, Long Term Evolution, cellular communication system and also in many optical communications systems. In MCM communications systems, an available communications channel is divided into frequency chunks, called sub-carriers. The resulting sub-carriers therefore have a comparably narrow bandwidth compared to the total system bandwidth.

A drawback of traditional MCM transceivers is a certain sensitivity to phase noise. This is due to the fact that phase noise causes ICI, Inter-Carrier Interference, between the sub-carries of an MCM system, and also to the fact that traditional phase compensation methods based on feedback loops, e.g., the PLL, Phase Locked Loop, are not well suited for MCM systems. The reason why phase compensation methods based on feedback loops are ill suited for use in MCM systems are mainly two-fold:

First, since the sub-carriers in an MCM system have relatively narrow bandwidths, modulated data symbols transmitted over MCM sub-carriers will be of a comparably long symbol time duration, which will limit the achievable bandwidth of a phase compensation system based on a feedback loop such as a PLL.

Second, MCM demodulation requires frequency domain techniques that always incur a delay in the time domain. This delay will further limit the achievable bandwidth of a phase compensation system based on a feedback loop such as a PLL.

In some MCM systems, frequency domain pilot symbols are often used for aiding in phase compensation, and complex methods are used for ICI mitigation to suppress the residual ICI effects of phase noise. Such means to alleviate phase noise effects add significantly to the complexity of the MCM transceiver.

U.S. Pat. No. 8,139,681 B2 describes a PLL-based frequency correction system that comprises re-modulation of a received communications signal. The update rate of the PLL loop filter is thus high, even if the receiver is used to receive an MCM signal with long symbol duration. However, the attainable bandwidth in the PLL is low due to the loop feedback delay, which thus limits the performance of the device of this document.

SUMMARY

It is an object to obviate at least some of the disadvantages mentioned above and to provide an improved receiver for MCM signals.

Such a solution is provided by a communications receiver which is arranged to receive a Multi Carrier Modulated, MCM, signal with embedded pilot symbols. The communications receiver comprises a first phase adjustment unit, and the first phase adjustment unit is arranged to adjust the phase of a received MCM signal by means of the embedded pilot symbols and to output a first phase adjusted MCM signal to an MCM re-modulator unit which is arranged to demodulate and to then modulate the first phase-adjusted MCM signal in order to create an MCM reference signal.

The communications receiver also comprises a second phase adjustment unit which is arranged to receive the first phase adjusted MCM signal and to also receive the MCM reference signal. The second phase adjustment unit is arranged to adjust the phase of the first phase adjusted MCM signal by means of the MCM reference signal, and to output a second phase adjusted MCM signal to an output MCM demodulator which is arranged to demodulate the second phase adjusted MCM signal and to output the demodulated MCM signal as the output signal of the receiver.

Phase noise is reduced by means of this communications receiver due to the fact that it comprises a second phase adjustment unit which receives the first phase adjusted MCM signal and the MCM reference signal. This creates a feed forward connection of the MCM reference signal, which in turn enables a high bandwidth in the phase adjustment of the MCM receiver, which inherently leads to good phase noise suppression. This is as opposed to a feedback connection of the MCM reference signal, where processing delays limit the bandwidth of the MCM receiver's phase noise suppression.

In embodiments of the communications receiver, the first phase adjustment unit comprises a first phase error device which is arranged to create a first phase error signal using the MCM signal and a known reference phase. The first phase error device is also arranged to transmit the first phase error signal to a first phase tracking device which is arranged to track the first phase error signal in order to output a first phase rotation value to a first phase rotation unit. The first phase rotation unit is arranged to adjust the phase of the MCM input signal of the first phase adjustment unit by means of the first phase rotation value.

In embodiments of the communications receiver, the first phase adjustment unit also comprises a time domain equalizer arranged to perform time-domain equalization on the input signal to the first phase error device.

In embodiments, the communications receiver also comprises an equalizer update unit arranged to update the transfer function of the time domain equalizer by means of the MCM reference signal and the received MCM signal.

In embodiments, the second phase adjustment unit comprises a second phase error device which is arranged to create a second phase error signal using the first phase adjusted MCM signal and the MCM reference signal received from the MCM re-modulator. The second phase adjustment unit is also arranged to transmit this second phase error signal to a second phase tracking device arranged to track the second phase error signal in order to output a second phase rotation value to a second phase rotation unit.

The second phase rotation unit is arranged to adjust the phase of the first phase adjusted MCM input signal of the second phase adjustment unit by means of the second phase rotation value.

In embodiments, the communications receiver is arranged to receive an MCM signal transmitted by a single transmitter such that all sub-carriers of the received MCM signal have been up-converted in frequency by the same VCO on the transmit side.

In embodiments of the communications receiver, the first phase adjustment unit is arranged to operate in the time domain.

In embodiments of the communications receiver, the second phase adjustment unit is arranged to operate in the time domain.

There is also provided a method for use in an MCM communications receiver. The method comprises receiving an MCM signal with embedded pilot symbols and performing a first phase adjustment of the received MCM signal by means of the embedded pilot symbols in order to obtain a first phase adjusted MCM signal.

The method also comprises re-modulation of the first phase adjusted MCM signal comprising demodulating and then modulating the first phase-adjusted MCM signal in order to create an MCM reference signal.

The method further comprises performing a second phase adjustment of the first phase adjusted MCM signal by means of the MCM reference signal in order to create a second phase adjusted MCM signal.

The method disclosed by the invention also comprises demodulating the second phase adjusted MCM signal in order to create and output an output signal of the MCM communications receiver.

BRIEF DESCRIPTION OF THE DRAWINGS

The invention will be described in more detail in the following, with reference to the appended drawings, in which.

DETAILED DESCRIPTION

Figure 1:
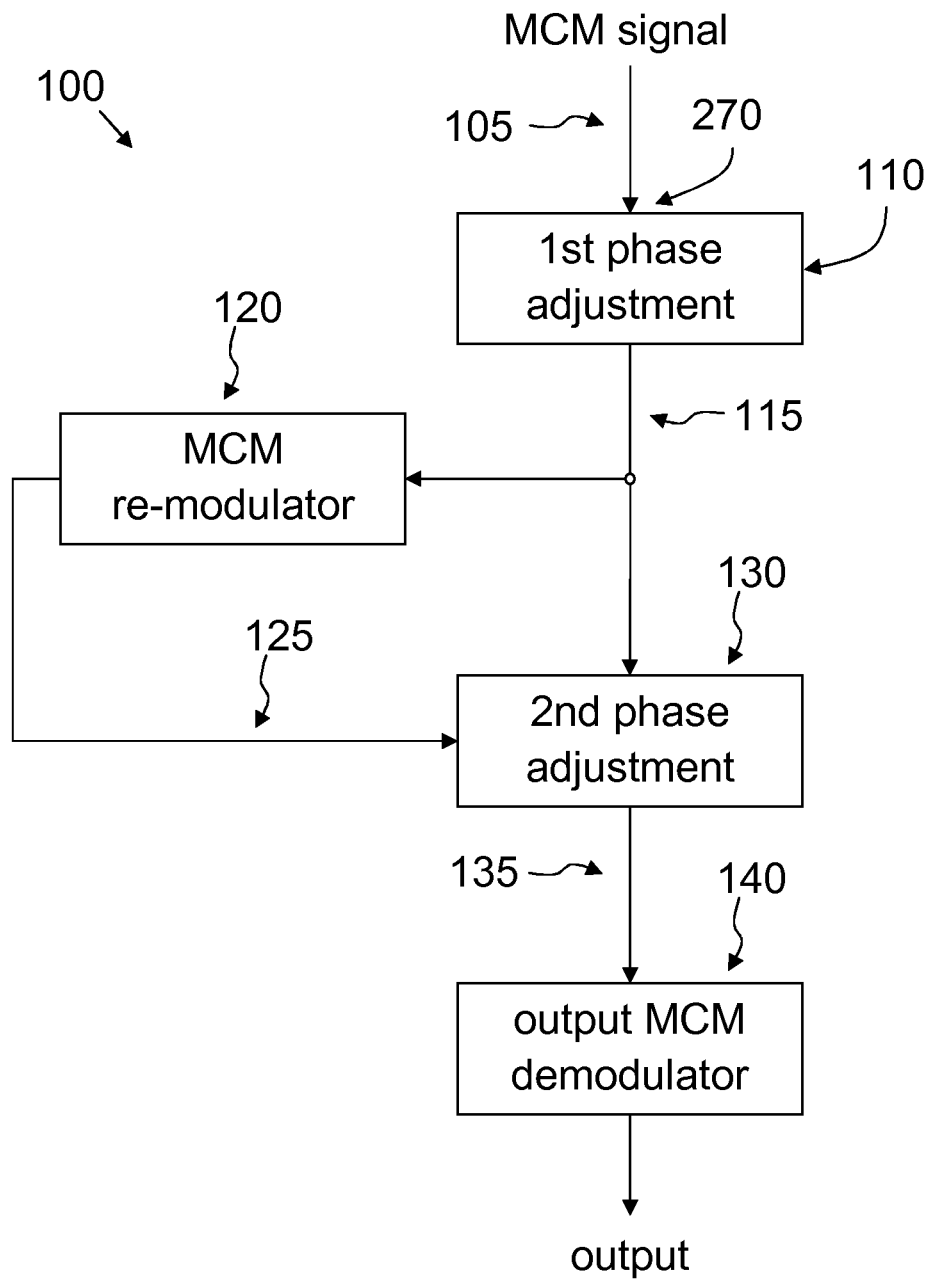
FIG. 1 shows an MCM communications receiver.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

FIG. 1 shows an MCM communications receiver 100 according to an embodiment of the invention. An MCM signal 105 received at a first input port 270 is arranged to be adjusted in phase by a first phase adjustment unit 110 in order to create a first phase adjusted signal 115. This first phase adjustment is done by means of pilot symbols embedded in the received MCM signal 105, in a manner which will be described in more detail later in this text. By means of the use of pilot symbols, the first phase adjustment 110 can be done prior to demodulating the MCM signal.

In various embodiments, the pilot symbols mentioned throughout this text are either time or frequency domain pilot symbols. It should be noted that the pilot symbols do not necessarily carry only known data, although this may be the case. However, the pilot symbols always have a known phase. Hence, a pilot symbol may carry unknown data, e.g., by means of amplitude modulation, which is not in conflict with having a known phase.

The first phase adjusted signal 115 is arranged to be subjected to re-modulation by an MCM re-modulator unit 120. This re-modulation of the first phase adjusted signal 115 comprises first demodulating and then modulating the MCM signal. In this way, noise and distortion in the signal is quantized out and a clean MCM reference signal 125 is created by the MCM re-modulator 120. It should be noted that this clean MCM reference signal is not necessarily, and does not have to be, exactly the same as the MCM signal which was transmitted at "the other end" of the connection of which the MCM receiver 100 is a part.

Following the first phase adjustment 110, a second phase adjustment of the first phase adjusted MCM signal 115 is performed using the MCM reference signal 125. To this end, the MCM receiver 100 comprises a second phase adjustment unit 130 which is arranged to use the MCM reference signal 125 and the first phase adjusted MCM signal 115, in a manner which will be described in more detail below. The result of the second phase adjustment is then a second phase adjusted MCM signal 135.

In order to exploit the MCM reference signal 125 for phase adjustment in the second phase adjustment unit 130, the received first phase adjusted signal 115 needs to be delayed in order to account for delays incurred in the MCM re-modulator unit 120 and to thus align the first phase adjusted signal 115 with the MCM reference signal 125. It should be noted that delays in the MCM re-modulator unit 120 do not impair the performance of the MCM receiver 100, since the MCM reference signal 125 is arranged to be "fed forward" to the second phase adjustment unit 130. This is in contrast to the delay sensitivity of traditional feedback systems.

The output of the communications receiver 100 is generated by an output MCM demodulator unit 140, which is arranged to take the second phase adjusted MCM signal 435 as input, demodulate it, and output a demodulated MCM signal.

Regarding the demodulating performed in the MCM re-modulator 120 and in the output MCM demodulator 140, the following can be said about their basic function: a basic function of the demodulation performed in both of these units, is to recover information bits in the received MCM signal 405, and a basic function of the MCM modulation performed in the MCM re-modulator unit 120 is to convert the recovered information bits to an MCM signal.

Figure 2:
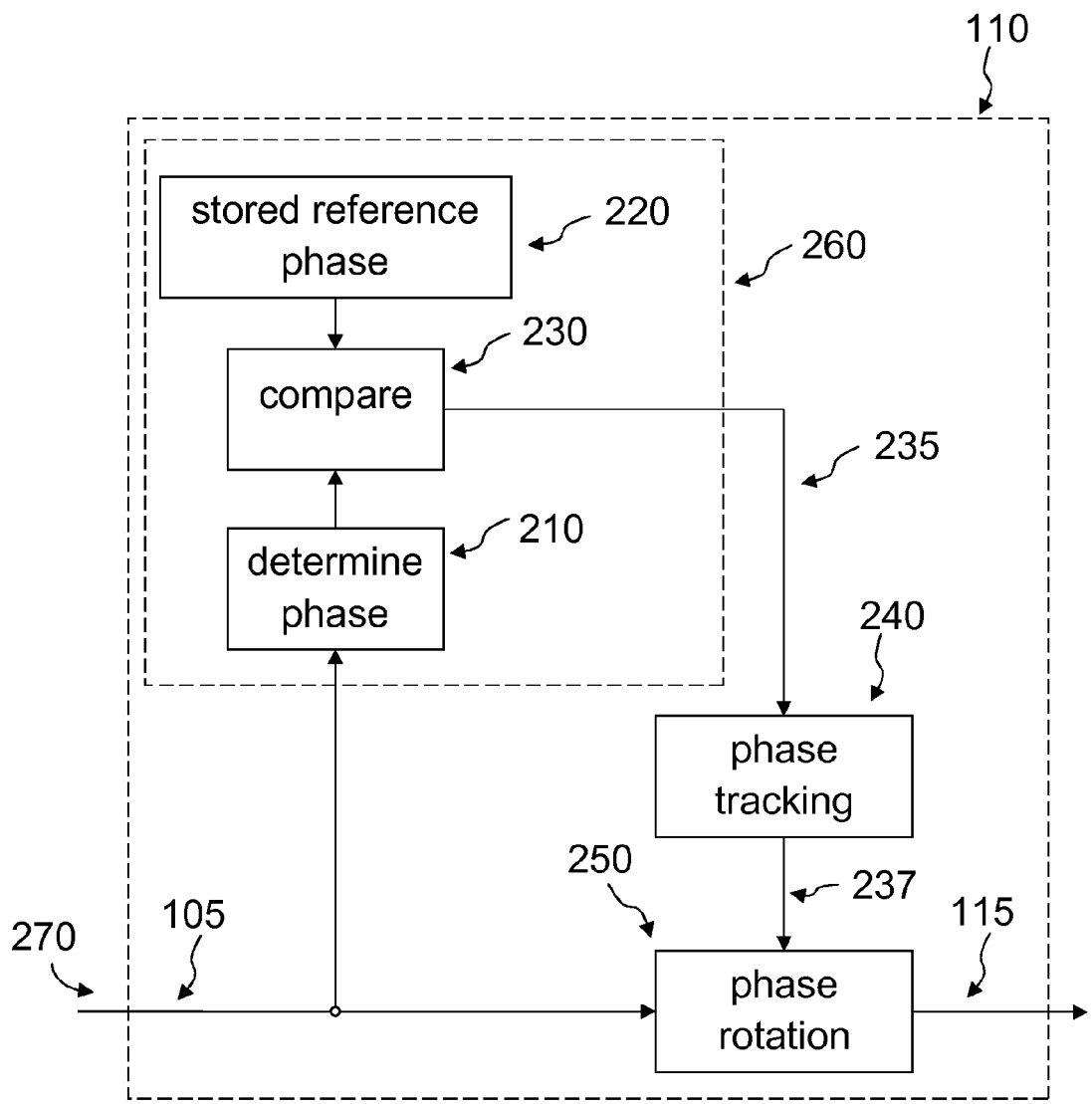
FIG. 2 shows a first embodiment of a phase adjustment unit.

FIG. 2 shows a first embodiment of the first phase adjustment unit 110. As mentioned above, a purpose of the first phase adjustment unit 110 is to adjust the phase of a received MCM signal 105 received at the first input port 270. This purpose is accomplished by means of a first phase rotation unit 250. The first phase rotation unit 250 is arranged to receive the MCM signal 105 and to rotate the phase of the received MCM signal 105 according to a first phase rotation value 237 which the first phase rotation unit 250 is arranged to receive from a first phase tracking device 240 which is comprised in the first phase adjustment unit 110. The first phase rotation unit 250 suitably comprises a (not shown) delay unit arranged to delay the received MCM signal 105, in order to align MCM input signal to be phase adjusted with the correct first phase rotation value 237.

The phase tracking device 240 is arranged to generate the phase rotation value 237 used by the phase rotation unit 250 for rotation of the received MCM signal 105 by means of a phase error signal 235. In various embodiments, the phase tracking device 240 may comprise e.g. a low pass filter, a Kalman filter, or a method based e.g. on the expectation maximization, EM, algorithm. The phase tracking device 240 may also be arranged to determine phase rotation values 237 based on one or more phase rotation values which have already been determined, for instance based on interpolation between these values which have already been determined.

The phase error signal 235 in this embodiment of the first phase adjustment device 110 is generated by means of a first phase error device 260. The first phase error device 260 determines the phase of the received MCM signal 105 using a phase determining device 210 which exploits embedded pilot symbols in the received MCM signal 105. The determined phase of the received MCM signal 105 is then compared by means of a phase comparison device 230 to a stored reference phase 220 in order to determine the difference between the phase of the received MCM signal 105 and the stored reference phase 220, which difference is arranged to be the phase error signal 235 output from the phase error device 260.

In embodiments, the output phase error signal 235 is arranged to be constrained by the phase error device 260 to be in the interval of [−pi, pi) radians. If the phase error signal 235 prior to being output from the phase error device 260 is outside of the interval [−pi, pi) radians, an even multiple of 2*pi radians is added to or subtracted from the phase error signal 235 in order to force the phase error signal to comply with said interval constraint. It should be noted that the phase angle represented by the phase error signal 235 is not affected by this [−pi, pi) interval constraint.

In embodiments, the phase error signal 235 may be updated each time a new sample of the received MCM signal 105 is input to the first phase error device 260, or more seldom.

In embodiments, the first phase error device 260 comprises (not shown) means for interpolating between consecutive outputs from the phase comparison device 230 in order to increase the rate of the phase error signal 235. Thus, the comparably low rate of a phase error signal based only on sparsely embedded pilot symbols in the received MCM signal 105 can be increased by means of said interpolation.

Figure 3:
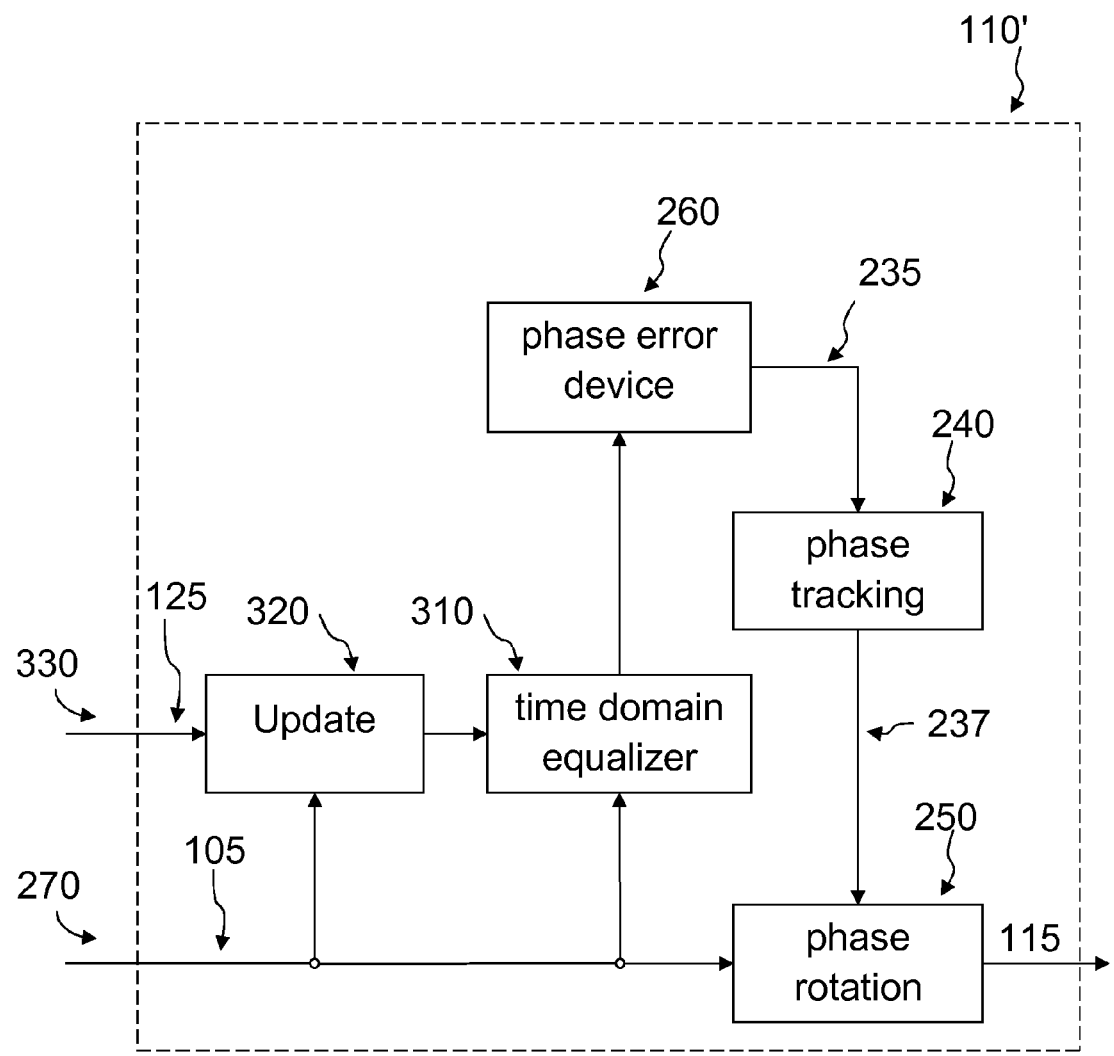
FIG. 3 shows a second embodiment of a phase adjustment unit.

In FIG. 3, a second embodiment 110' of the first phase adjustment unit is shown. This second embodiment 110' of the first phase adjustment unit also comprises a second input port 330 arranged to receive the MCM reference signal 125, i.e. the MCM reference signal 125 which is an output from the MCM re-modulator unit 120.

The first phase adjustment unit 110' shown in FIG. 3 further comprises a phase error device 260, a phase tracking device 240 and a phase rotation unit 250 identical in purpose and function to the corresponding devices of the first embodiment of the phase rotation unit 110 shown in FIG. 2 and described above. In addition, a time domain equalizer 310 and an equalizer update unit 320 are further comprised in the phase adjustment unit 110' shown in FIG. 3.

The time domain equalizer 310 shown in FIG. 3 is arranged to process the input MCM signal 105 to the first phase error device 260 in order to suppress linear distortion in the received MCM signal 105 prior to first phase error device determining the first phase error 235. It should be noted that the received MCM signal 105 which is arranged to be input to the first phase rotation unit 250 is not processed by the time domain equalizer 310—the MCM signal 105 received by the first phase adjustment device 110' is thus used both by the time domain equalizer 310 and the phase rotation unit 250.

The time domain equalizer 310 comprised in the second embodiment 110' of the first phase adjustment unit is an adaptive equalizer which is arranged to be updated by means of the equalizer update unit 320. The equalizer update unit 320 is arranged to update the transfer function of the time domain equalizer 310 by means of the received MCM signal 105 and the MCM reference signal 125. Thus, the received MCM signal 105 received by the first phase adjustment device 110' is used not only by the time domain equalizer 310 and the phase rotation unit 250, but also by the equalizer update unit 320.

In embodiments, the method which the equalizer update unit 320 is arranged to use for updating the transfer function of the time domain equalizer 310 may be based on, e.g., Least Mean Squares, LMS, or Recursive Least Squares, RLS. The LMS and the RLS methods both suitably use an equalizer update error signal in order to function as intended. This equalizer update error signal is suitably determined as the difference between the MCM reference signal 125 and the received MCM signal 125.

In embodiments, the equalizer update unit 320 is suitably also arranged to exploit pilot symbols embedded in the received MCM signal 105 when updating the transfer function of the time domain equalizer 310. Accordingly, the equalizer update unit 320 is arranged to detect the presence of an embedded pilot symbol in the received MCM signal 105, and to, when an embedded pilot symbol is detected in the received MCM signal 105, determine the equalizer update error signal as the difference between a (not shown) stored embedded pilot symbol value and the received MCM signal 125, as opposed to determine the equalizer update error signal as the difference between the MCM reference signal 125 and the received MCM signal 125.

Figure 4:
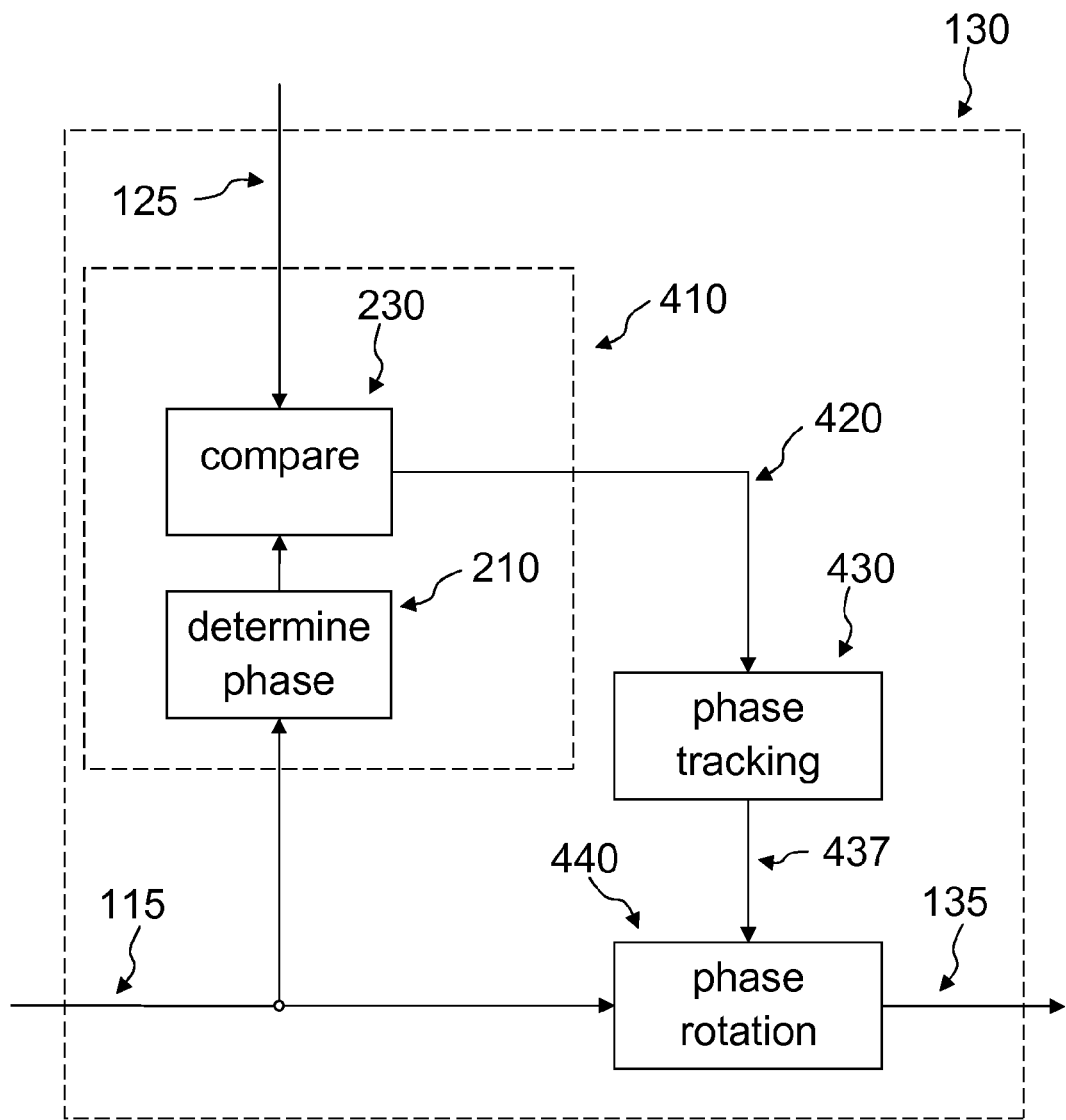
FIG. 4 shows a third embodiment of a phase adjustment unit.

In FIG. 4, an embodiment of the second phase adjustment unit 130 is shown. The second phase adjustment unit 130 is arranged to adjust the phase of the first phase adjusted MCM signal 115, i.e. the output signal of the first phase adjustment unit 110, by means of a second phase rotation unit 440. The second phase rotation unit 440 is arranged to receive the first phase adjusted MCM signal 115, and to rotate the phase of the first phase adjusted MCM signal 115 according to a second phase rotation value 437, which second phase rotation value 437 is received by the second phase rotation unit 440 from a second phase tracking device 430. The second phase rotation unit 440 suitably comprises a (not shown) delay unit arranged to delay the first phase adjusted MCM signal 115, in order to align the first phase adjusted MCM signal 115 with the second phase rotation value 437.

The second phase tracking device 430 is arranged to determine the second phase rotation value 437 by means of a second phase error signal 420. In various embodiments, the second phase tracking device 430 may comprise a low pass filter, a Kalman filter, or a method based, e.g., on the expectation maximization, EM, algorithm.

The second phase error signal 420 is generated by means of a second phase error device 410. The second phase error device 410 determines the phase of the first phase adjusted MCM signal 115 using a phase determining device 210. The determined phase of the first phase adjusted MCM signal 115 is then compared by means of a phase comparison device 230 to the phase of the MCM reference signal 125 from the MCM re-modulator unit 120, which MCM reference signal 125 is arranged to be an input signal of the phase error device 410. The result of said comparison is the difference between the determined phase of the received phase adjusted MCM signal 115 and the phase of the received MCM reference signal 125, which difference is arranged to be the second phase error signal 420.

In embodiments, the second phase error signal 420 is arranged to be constrained by the second phase error device 410 to be in the interval of [−pi, pi) radians. If the difference between the phase of the MCM reference signal 125 and the determined phase of the phase adjusted MCM signal 115 is outside of the interval [−pi, pi) radians, an even multiple of 2*pi radians is added to or subtracted from said difference in order to comply with the interval constraint of [−pi, pi) radians.

As in the second embodiment of the first phase adjustment unit 110′, the second phase adjustment unit 130 may in embodiments comprise a (not shown) time domain equalizer arranged to suppress linear distortion in the first phase adjusted MCM input signal 115 of the second phase error device 410. Such a time domain equalizer is suitably an adaptive equalizer which is arranged to be updated by an (not shown) equalizer update device. The equalizer update device may suitably be arranged to exploit pilot symbols embedded in the received MCM signal when updating the transfer function of the time domain equalizer.

In embodiments of the second phase adjustment unit 130, the phase tracking device 430 of the second phase adjustment unit 130 may be arranged to exploit phase information received from the phase tracking device 240 of the first phase adjustment unit 110, 110′. Accordingly, in embodiments, the phase tracking device 430 is arranged to generate the phase rotation value 437 by means of the first phase rotation value 237 in addition to the phase error signal 420. Exploiting the first phase rotation value 237 in the phase tracking device may be accomplished in a number of ways, e.g., by incorporating it as an additional input to a Kalman filter arranged to determine the phase rotation value 437.

In embodiments of the second phase adjustment unit 130, the phase error device 410 may be arranged to exploit pilot symbols embedded in the first phase adjusted MCM signal to generate the phase error signal 420. Accordingly, the phase comparison device 230 is arranged to detect the presence of an embedded pilot symbol in the first phase adjusted MCM signal 115, and to, when an embedded pilot symbol is detected, determine the difference between the phase of the received MCM signal 105 and a (not shown) stored reference phase, which difference is arranged to be the phase error signal 420 output from the second phase error device 410.

In FIG. 1, there is shown a combination of one MCM re-modulator 120 and one second phase adjustment unit 130. In embodiments of the disclosed communications receiver, a plurality N (integer value) of such combinations of one MCM re-modulator unit 120 and one second phase adjustment unit may be comprised, connected serially, i.e. the phase adjusted MCM signal from combination number N−1 is arranged to be the input signal to combination number N, with the first phase adjusted MCM signal 115 being arranged to be the input signal to the first combination, i.e. combination number 1. In this way the phase of the received MCM signal 105 is arranged to be iteratively adjusted prior to its demodulation and the output of recovered information bits of the received MCM signal 105.

Figure 5:
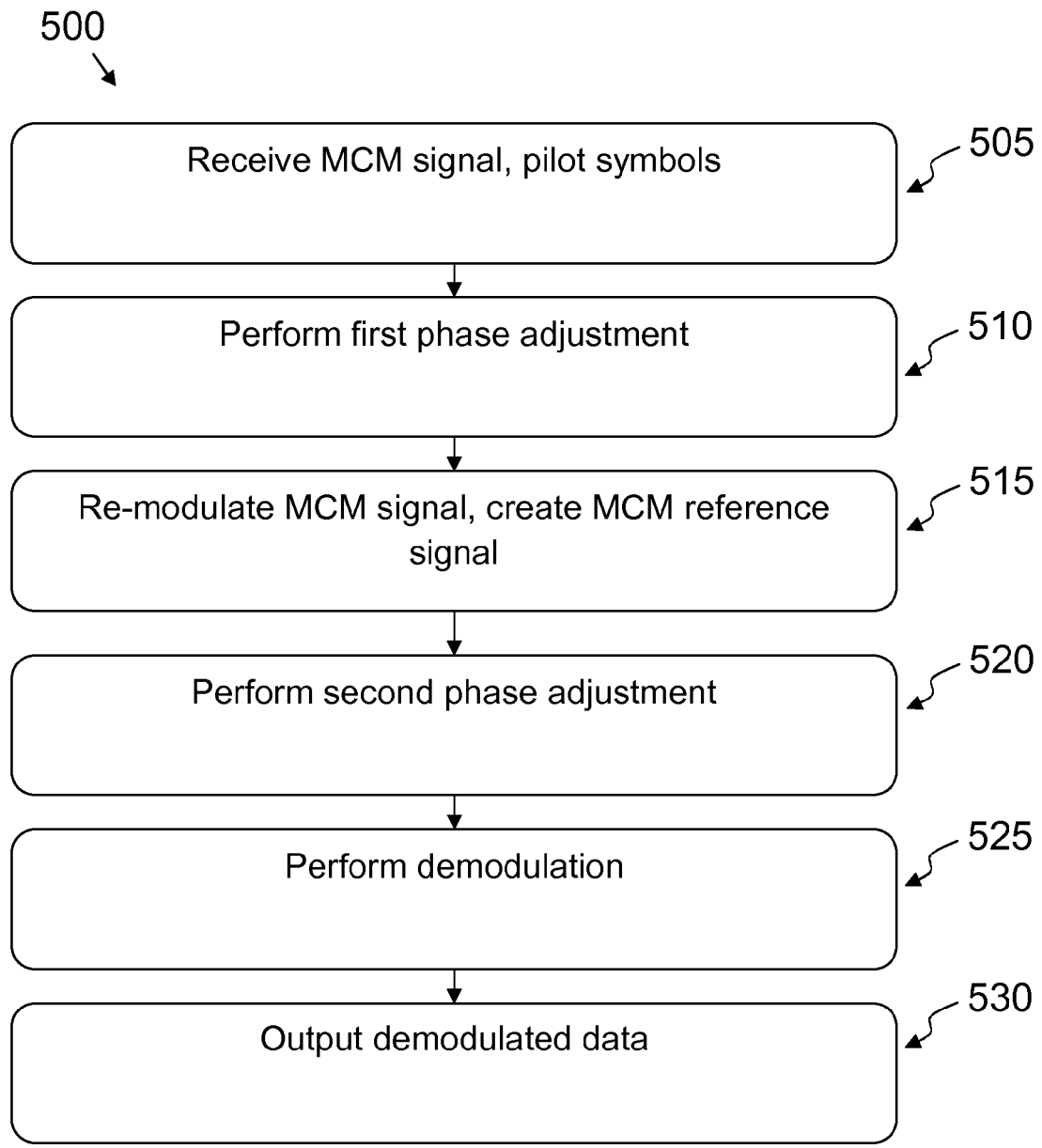
FIG. 5 shows a flow chart of a method of the invention.

FIG. 5 shows a schematic flow chart of a method 500 for use in an MCM communications receiver. The method 500 comprises, step 505, receiving an MCM signal with embedded pilot symbols and, step 510, performing a first phase adjustment of the received MCM signal in order to obtain a first phase adjusted MCM signal. The first phase adjustment is performed in order to compensate for a phase error in the received MCM signal.

The method 500 comprises, step 515, re-modulating the first phase adjusted signal created in step 510 of the method 500. The step 515 of re-modulating the first phase adjusted MCM signal comprises demodulation of the MCM signal followed by modulation of the MCM signal in order to create an MCM reference signal. In step 515 of the method 500, a basic function of the demodulation performed is to recover information bits in the received MCM signal, and a basic function of the MCM modulation performed is to convert the recovered information bits to an MCM signal.

The method 500 further comprises, step 520, performing a second phase adjustment of the first phase adjusted signal to create a second phase adjusted MCM signal. This second phase adjustment is performed by means of the first phase adjusted MCM signal and the MCM reference signal created in step 515 of the method 500. The second phase adjustment is performed in order to further compensate for a remaining phase error in the first phase adjusted MCM signal. This is possible since the second phase adjustment unit has access to the MCM reference signal, which was not available at the time of the first phase adjustment.

The method 500 further comprises, step 525, performing a demodulation of the second phase adjusted MCM signal in order to recover information bits in the received MCM signal and to, step 530, output the recovered information bits as demodulated data from the MCM communications receiver.

In embodiments of the method 500, step 510 as described above, i.e. performing a first phase adjustment of the received MCM signal, further comprises determining a first phase error signal by means of the received MCM signal and a known reference phase, and also comprises tracking of the first phase error signal in order to output a first phase rotation value, and adjusting the phase of the received MCM signal by means of the first phase rotation value to create a first phase adjusted MCM signal. In embodiments, step 510 also comprises performing time-domain equalization on the MCM input signal, suitably prior to determining the first phase error signal. In embodiments, step 510 also comprises updating a time domain equalization transfer function. The method used for updating the time domain equalization transfer function may be based on, e.g., the Least Mean Squares, LMS, or Recursive Least Squares, RLS, method.

The first phase error signal is suitably determined as the difference between the known reference phase and the phase of the received MCM signal. The tracking of the first phase error signal can be accomplished in a number of different ways, e.g., by low-pass filtering the phase error signal, by Kalman filtering the phase error signal, or by processing the phase error signal by means of a method based on the expectation maximization, EM, algorithm.

In embodiments of the method 500, step 520 of performing a second phase adjustment of the first phase adjusted MCM signal further comprises determining a second phase error signal by means of the first phase adjusted MCM signal and the MCM reference signal as well as tracking of the second phase error signal in order to output a second phase rotation value and adjusting the phase of the first phase adjusted MCM signal by means of the second phase rotation value in order to create a second phase adjusted MCM signal. Suitably, the second phase error signal is determined as the difference between the phase of the MCM reference signal and the phase of the first phase adjusted MCM signal. The tracking of the second phase error signal can be accomplished in a number of different ways, e.g., by low-pass filtering the phase error signal, by Kalman filtering the phase error signal, or by processing the phase error signal by means of a method based on the expectation maximization, EM, algorithm.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A communications receiver comprising a data processing apparatus that implements:
    a first phase adjustment unit adjusting the phase of a received Multi Carrier Modulated (MCM) signal with embedded pilot symbols, by using said embedded pilot symbols and outputting a first phase adjusted MCM signal to an MCM re-modulator unit, wherein the MCM re-modulator unit demodulates said first phase-adjusted MCM signal and then modulates said first phase-adjusted MCM signal in order to create an MCM reference signal; and
    a second phase adjustment unit receiving the first phase adjusted MCM signal and receiving said MCM reference signal, and adjusting the phase of the first phase adjusted MCM signal using said MCM reference signal and outputting a second phase adjusted MCM signal to an output MCM demodulator, wherein the MCM demodulator demodulates the second phase adjusted MCM signal and outputs the demodulated MCM signal as the output signal of the communications receiver.

2. The communications receiver according to claim 1, in which the first phase adjustment unit comprises a first phase error device creating a first phase error signal using the received MCM signal and a known reference phase, and transmitting the first phase error signal to a first phase tracking device, the first tracking device tracking said first phase error signal in order to output a first phase rotation value to a first phase rotation unit, the first phase rotation unit adjusting the phase of the received MCM signal using said first phase rotation value.

3. The communications receiver according to claim 2, in which the first phase adjustment unit also comprises a time domain equalizer performing time-domain equalization on the input signal to the first phase error device.

4. The communications receiver according to claim 3, wherein the data processing apparatus further implements an equalizer update unit,
    wherein the equalizer update unit updates the transfer function of the time domain equalizer using the MCM reference signal and the received MCM signal.

5. The communications receiver according to claim 1, in which the second phase adjustment unit comprises a second phase error device,
    wherein the second phase error device creates a second phase error signal using the first phase adjusted MCM signal and the MCM reference signal from the MCM re-modulator, and transmits the second phase error signal to a second phase tracking device,
    wherein the second phase tracking device tracks said second phase error signal in order to output a second phase rotation value to a second phase rotation unit,
    wherein the second phase rotation unit adjusts the phase of the first phase adjusted MCM input signal of the second phase adjustment unit using said second phase rotation value.

6. The communications receiver of claim 1, wherein the data processing apparatus further implements the receiving of an MCM signal transmitted by a single transmitter such that all sub-carriers of the received MCM signal have been up-converted in frequency by the same VCO on the transmit side.

7. The communications receiver of claim 1, in which the first phase adjustment unit operates in the time domain.

8. The communications receiver of claim 1, in which the second phase adjustment unit operates in the time domain.

9. The communications receiver of claim 1, wherein the data processing unit additionally implements a plurality of serially connected combinations of one MCM re-modulator unit and one secondary phase adjustment unit iteratively adjusting the phase of the received MCM signal prior to demodulating the phase adjusted MCM signal and outputting the demodulated MCM signal as the output signal of the receiver.

10. A method for use in an Multi Carrier Modulated MCM communications receiver, the method comprising:
    receiving an MCM signal with embedded pilot symbols and performing a first phase adjustment of the received MCM signal using said embedded pilot symbols in order to obtain a first phase adjusted MCM signal;
    re-modulation of the first phase adjusted MCM signal, comprising demodulating said first phase-adjusted MCM signal and then modulating said first phase-adjusted MCM signal in order to create an MCM reference signal;
    performing a second phase adjustment of the first phase adjusted MCM signal using said MCM reference signal in order to create a second phase adjusted MCM signal; and
    demodulating the second phase adjusted MCM signal in order to create and output an output signal from the MCM communications receiver.

11. The method of claim 10, wherein the performing of the first phase adjustment of the received MCM signal further comprises:
   determining a first phase error signal using the received MCM signal and a known reference phase,
   tracking of said first phase error signal in order to output a first phase rotation value, and
   adjusting the phase of the received MCM signal using said first phase rotation value to create a first phase adjusted MCM signal.

12. The method of claim 11, wherein the performing of the first phase adjustment of the received MCM signal further comprises performing time-domain equalization on the MCM input signal.

13. The method of claim 12, wherein the performing of the first phase adjustment of the received MCM signal further comprises updating the time domain equalization transfer function.

14. The method of claim 10, wherein the performing of the second phase adjustment of the first phase adjusted MCM signal further comprises:
   determining a second phase error signal using the first phase adjusted MCM signal and the MCM reference signal from the MCM re-modulator unit,
   tracking of said second phase error signal in order to output a second phase rotation value, and
   adjusting the phase of the first phase adjusted MCM signal using said second phase rotation value to create the second phase adjusted MCM signal.

15. The communication receiver of claim 1, wherein the MCM re-modulator unit and the MCM demodulator are part of the communication receiver.

* * * * *